United States Patent [19]
Ernst et al.

[11] 3,963,105
[45] June 15, 1976

[54] BEARING AND CLUTCH DIAPHRAGM ASSEMBLY

[75] Inventors: Horst Ernst, Eltingshausen; Manfred Brandenstein, Aschfeld; Armin Olschewski, Schweinfurt, all of Germany

[73] Assignee: SKF Industrial Trading and Development Company, B.V., Amsterdam, Netherlands

[22] Filed: May 23, 1974

[21] Appl. No.: 472,861

[30] Foreign Application Priority Data
May 26, 1973 Germany............................ 2327023

[52] U.S. Cl. ............................... 192/98; 192/89 B; 308/235
[51] Int. Cl.² ........................................ F16D 23/14
[58] Field of Search ................ 192/98, 110 B, 89 B, 192/70.27, 70.29, 70.3, 99 A; 308/233, 235

[56] References Cited
UNITED STATES PATENTS

| | | | |
|---|---|---|---|
| 2,952,453 | 9/1960 | Haussermann................ | 192/89 B X |
| 3,093,228 | 6/1963 | Binder.............................. | 192/89 B |
| 3,570,638 | 3/1971 | Baker............................ | 192/89 B X |
| 3,610,384 | 10/1971 | Bork..................................... | 192/98 |

FOREIGN PATENTS OR APPLICATIONS

927,811  6/1963  United Kingdom............. 192/110 B

*Primary Examiner*—Benjamin W. Wyche
*Attorney, Agent, or Firm*—Murray Schaffer

[57] ABSTRACT

A friction clutch integrated with a clutch release bearing for use with automotive vehicles. The friction clutch is provided with a disc shape spring release member in which a plurality of radial slots are formed creating a corresponding number of radially extending spring-like arms. The clutch release bearing is formed as an anti-friction bearing wherein one of its race members has an annular shoulder extending substantially axially away from the rolling bodies located therebetween. The shoulder is provided with several tabs, or tangs, uniformly distributed about its free end and which extend through the slots between adjacent pairs of the spring release arms.

6 Claims, 3 Drawing Figures

BEARING AND CLUTCH DIAPHRAGM ASSEMBLY

BACKGROUND OF THE INVENTION

The present invention relates to friction clutches and in particular to the integrated assembly of a friction clutch and a release bearing attached to the spring release member.

In general friction clutches employ a spring release member comprising a disc-like diaphragm or belleville type spring in which a plurality of radial slots are arranged about its central axis, thereby forming a corresponding number of radially inwardly directed spring release arms. The anti-friction release bearing is mounted in assembly with the spring release member so as to be resiliently engaged therewith. In one well known form of construction the anti-friction bearing is provided with a solid or massive race ring members, one of which is provided with an extension on which is formed an annular groove. The extension is adapted to be inserted within the central bore of the spring release member and the groove is adapted to allow the ends of the spring release arms to snap and engage therein thus fixing the bearing in its axial direction. In this construction the bearings are either inserted in a complex outer removable housing or are mounted on a sliding sleeve which itself is mounted to slide on a centering tube fixed to the outer casing of the gear transmission.

The known designs are relatively complicated and therefore expensive. Due to the solid and massive design of the bearing rings, the removable housing and the sliding sleeve, the weight of the clutch is too high for efficient operation. Furthermore, it is not possible to accurately center the release bearing in relation to the spring release member nor is it possible to maintain the bearing in an adequate centered position during operation of the clutch. As a result rapid wear of the friction clutch parts as well as of the bearing itself occur during the working state.

It is an object of the present invention to provide a friction clutch with an integrated clutch release bearing in which the disadvantages and defects of the prior art are overcome.

It is the present invention to provide a clutch release bearing adapted for attachment to a friction clutch which is relatively simple and of low weight, consisting of few inexpensively manufactured parts.

It is a further object of the present invention to provide an assembly of friction clutch and clutch release bearing in which the release bearing is capable of being centered and maintained centered with respect to the spring release member over extensive periods of operation.

The foregoing objects, other objects, together with numerous advantages of the present invention will be apparent from the following disclosure.

SUMMARY OF THE INVENTION

According to the present invention a clutch release bearing for use with a friction clutch for automotive vehicles is provided. The friction clutch employs a disc shaped spring release member having a plurality of slots extending radially from its center so as to form a plurality of radially inwardly extending spring release arms. The clutch release bearing is formed as a conventional anti-friction bearing and in accordance with the present invention is provided with an annular shoulder extending substantially axially away from the rolling bodies located between its race members. The shoulder is provided with a plurality of tabs or fingers which are uniformly distributed about its free end and which are adapted to extend through selective slots formed in the spring release member so as to engage between a pair of the spring arms. The race members of the anti-friction bearing constituting the release bearing are made from sheet metal.

In general, the interior construction of the clutch release bearing is conventional and any one of numerous known forms thereof may be used. However, by the use of race ring members made from sheet metal, the weight of the clutch release bearing may be significantly reduced while at the same time it may be made more simply and cheaply. Further, the use of this construction permits the provision of axially extending fingers or tabs which enter into the slots and engage the spring release member between adjacent arms in a manner permitting the construction of a unitary assembly of friction clutch and clutch release bearing. A further advantage lies in the fact that the bearing does not enter into the bore of the spring release member and thus leaves the ends of the spring arms free and more resiliently responsive to load conditions.

The race ring of the clutch release bearing which is provided with the fingers or tabs for attachment to the spring release member can be given the cross sectional shape of a Z or S configuration. One of the axial running shanks of such a Z or S shaped configuration can carry the attachment fingers or tabs. To insure fixing of the clutch release bearing against axial movement in the spring release member, the free ends of the fingers or tabs can be widened, preferably greater than the width of the slots into which they are inserted. In this manner the tabs may enter behind the rear wall of the spring release member and engage the surfaces of the corresponding spring arms. To the same end, the ends of the fingers or tabs may also be bent inwards toward the axis of the bearing, so as to engage the rear surface of the spring release arms in another fashion.

Accurate radial centering of the clutch bearing with regard to the spring release member is obtained by providing at least some of the slots of the spring release member with portions adjacent the interior bore with a reduced width as compared with that portion of the selected slots adjacent the periphery. The end portions of reduced width lie preferably about a circular arc centered about the central axis of the spring release members. The slots may be formed with selectively varying narrow portions so that concentric circles may be defined about the center of the spring release member. The attachment fingers or tabs of the clutch release bearing are inserted within the slots of a particular circle thereby centering the bearing in relation to the spring release member. Self-centering during continued operation is obtained due to the spring like resilience of the fingers.

Full details of the present invention are set forth in the following description of its preferred embodiments and is shown in the accompanying drawings.

Figure 1:
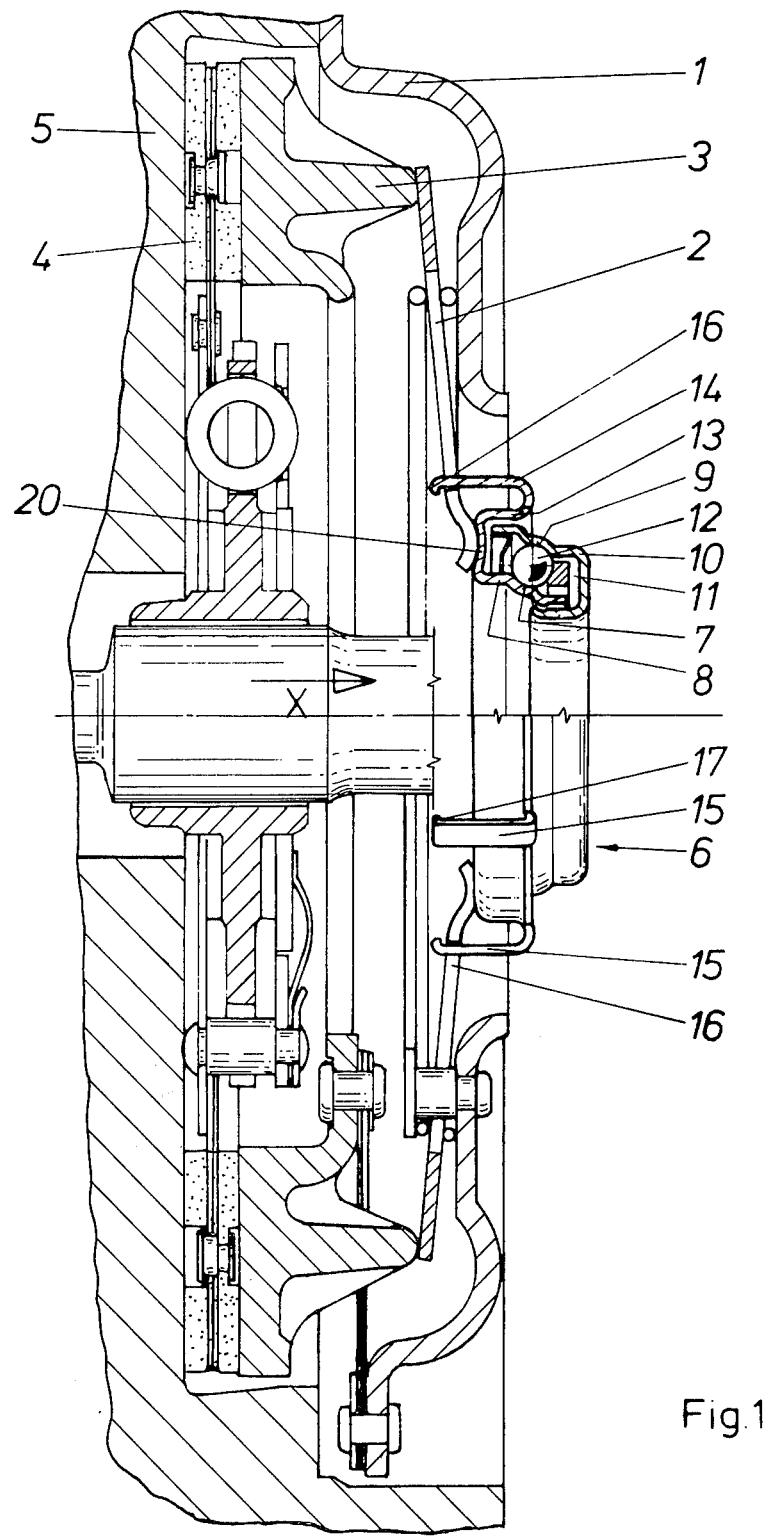
FIG. 1 is a sectional view of a friction clutch having a clutch release bearing formed in accordance with the present invention attached thereto.

In the friction clutch depicted in FIG. 1 there is arranged within an outer housing 1 a disc-like spring release member 2. The spring release member 2 may be a disc-shape diaphragm or cup-like washer of the belleville type. The outer peripheral edge of the spring release member bears against an annular axially extending edge 3 of a pressure plate which is urged to bear against a clutch plate 6 arranged between it and the driven plate 5. A clutch release bearing, generally depicted by the numeral 6 is attached to the spring release member 2. By means of the axial movement of this clutch release bearing 6 the spring release member 2 causes the clutch plate 4 to be detached from the driven plate 5 and thus the clutch release operation is effected.

In accordance with the present invention, the clutch release bearing 6 comprises an inner race surface 7 formed on an inner race ring member 8, an outer race surface 9 formed on an outer race ring member 10 between which is arranged a cage 11 in which a plurality of balls 12 are rotatably secured. The inner race ring 8 is formed of sheet metal and is bent so as to have a cup-shaped cross section defining an outer axially running wall 13. The axial wall portion 13 is provided with a shoulder 14 which is bent 180° so as to point away from the anti-friction rolling bodies or balls 12. The shoulder 14 is provided at its free end with several fingers 15 distributed over its periphery. Preferably the fingers 15 are uniformly spaced and extend an axial distance beyond the bottom wall of the cup-shaped inner race member.

Figure 2:
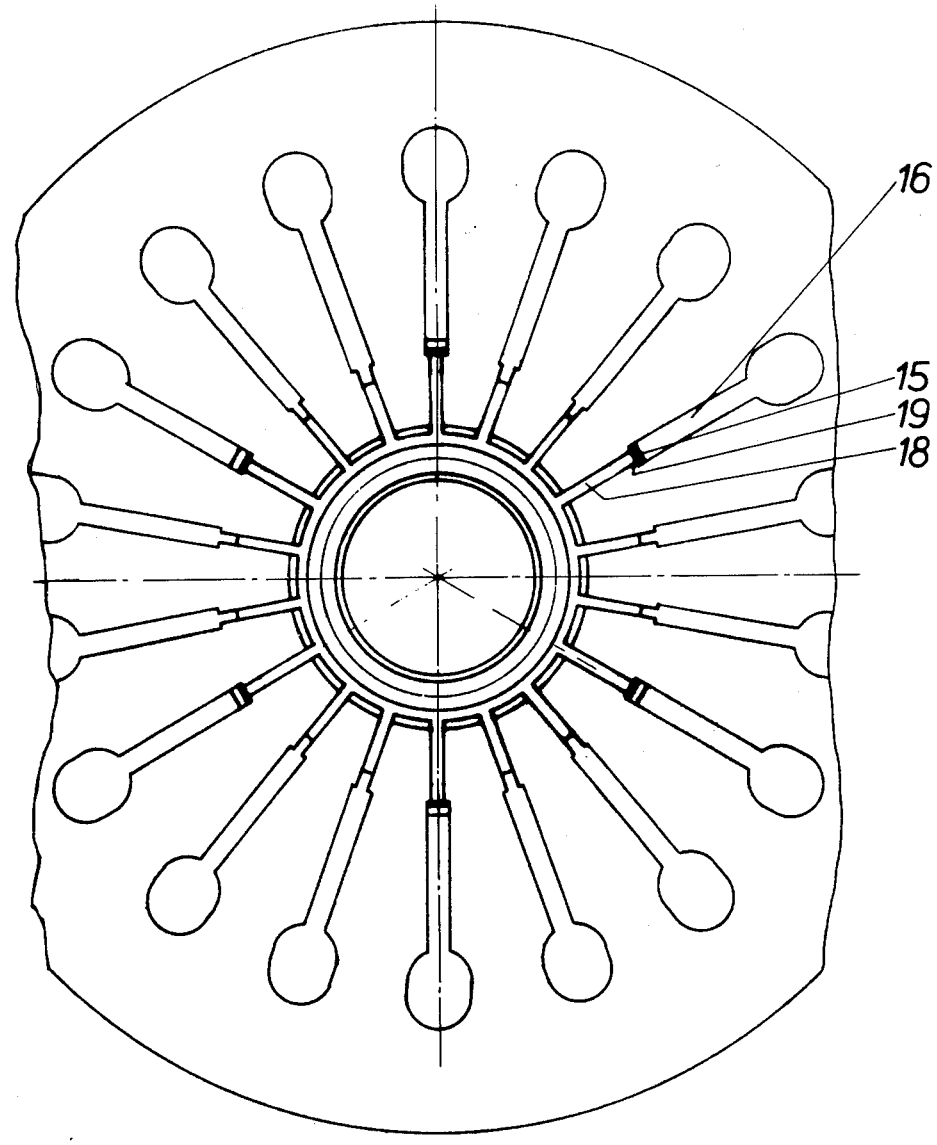
FIG. 2 is a plan view of a spring release member taken in the direction of the arrow X of FIG. 1.

As seen more clearly in FIG. 2 the spring release member is disc-shaped having a central bore and a peripheral outer edge. The spring release member is formed with a plurality of radially extending slots 16 extending from the bore toward the outer periphery. The slots form between them a corresponding number of spring-like arms 16a. Returning to FIG. 1 it will be seen that the annular shoulder 14 and the extending fingers 15 define a circle having a radius substantially greater than the radius of the bore of the spring release member 2. As a result the fingers 15 extend within the slots 16 of the spring release member somewhere between the bore and the outer extent of the slot 16. The fingers 15 are bent inwardly toward the axis of the bearing to provide curved ends 17 which engage behind the rear wall of the spring release member 2 to fix the bearing against axial movement. As seen in FIG. 2 each of the slots 16 is provided with a portion 18 of narrowed width lying adjacent to the central bore so as to form a shoulder 19 at the point of transition between the portion 18 and the remaining portion of the slot 16. The shoulders 19 lie along a circle having as its center the central axis of the spring release member. The attachment fingers 15 are adapted to enter into the slot 16 and lie against the shoulder 19 and thus since a plurality of such fingers 15 are provided spaced about the central axis the clutch release bearing 6 is fixed in relationship to the spring release member 2 against relative rotation. Selected ones of the slots 16 may be grouped together with their reduced width portions 18 so as to form shoulders 19 lying upon a common circle. This allows other groups of slots 16 to be formed with shoulders lying about a concentric circle of different radius, permitting adjustable insertion of different clutch release bearings.

In order to increase the self-centering effect of the clutch release bearing, the bottom wall 20 of the cup-shaped inner race member 8 is given a concave form to conform with the shape of the end portions of the arms 16a of the spring release member which themselves are given a convex shape. The bottom wall of the cup-shaped inner race ring 8 extends substantially radially with respect to the axis of the bearing.

The assembly of the clutch release bearing with the spring release member is simply executed by axially inserting some of the fingers 15 into the widened portions of the slots 16 and springing the remaining fingers 15 through the reduced sections 18 of the other slots until they overcome the maximum diameter at the transition shoulder 19. Thereafter, the arms 16a and the slots spring back into their normal position.

Figure 3:
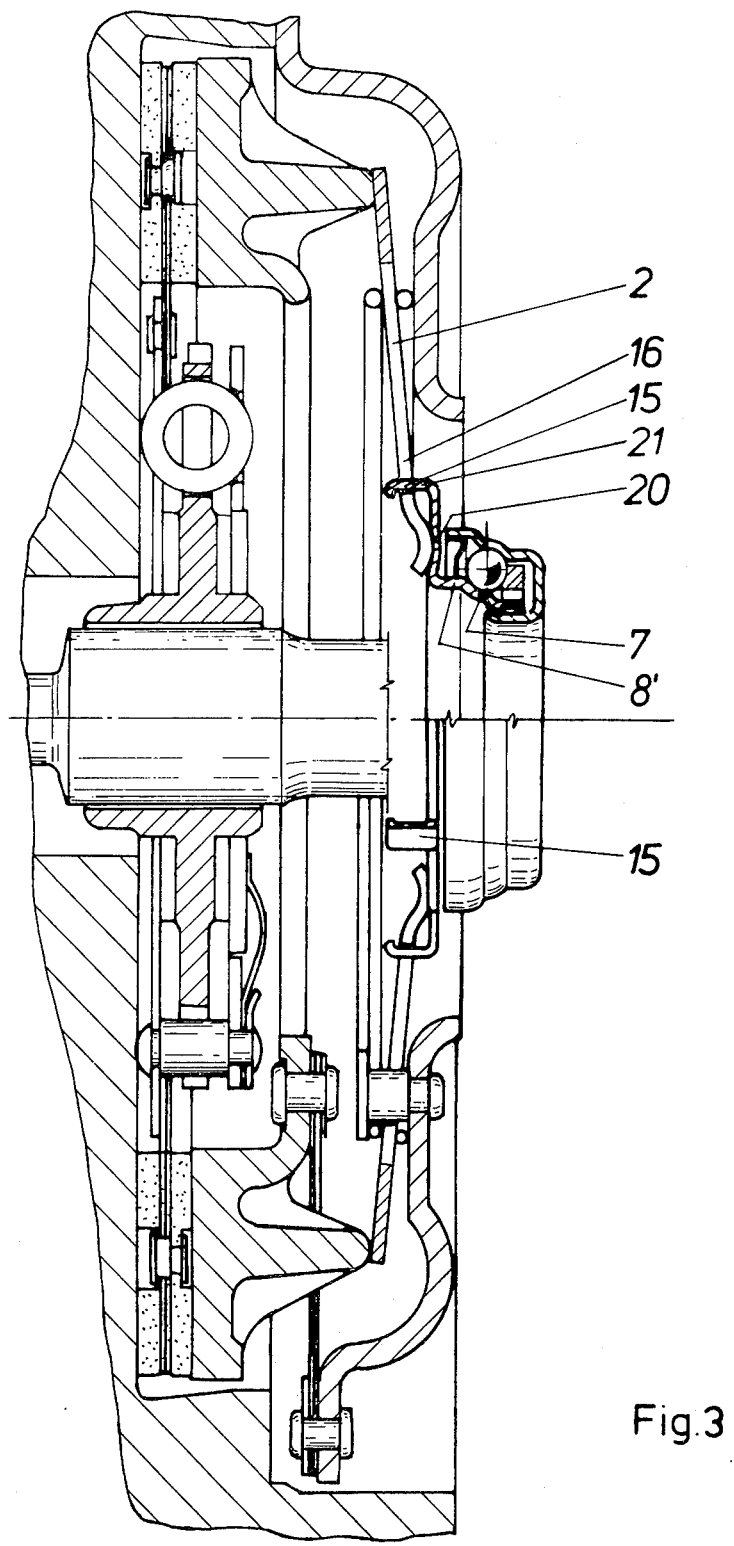
FIG. 3 is a sectional view similar to that of FIG. 1 showing a further embodiment of the clutch release bearing embodying the present invention.

In FIG. 3 a modified form of the clutch release bearing is depicted wherein the inner bearing ring 8', which carries the inner race surface 7 is bent into a form of a Z-shaped cross section rather than the cup or U-shaped cross section shown in FIG. 1. The race member 8' is thus formed with a bottom wall 20 engaging the curved inner end of the spring release arms and extends radially outward to form a shoulder 21 on which the extending fingers 15 are integrally formed. In other respects the construction of the clutch release bearing of FIG. 3 follows that of FIG. 1 and similar reference numerals are given to similar elements. The attachment of fingers 15 extend through the radial slots 16 of the spring release member 2 in exactly the same manner as described heretofore.

As seen from the foregoing the clutch release bearing formed in accordance with the present invention is simple, light weight and easy to assemble with the spring release member. Its race rings are formed from thin metal sheet out of which suitable configurations can be easily made and out of which the attachment of fingers may be easily formed. This construction further provides a self-centering bearing which under normal load conditions reduces and practically eliminates all of the reactive forces causing wear on either the bearing or the spring release member. The assembly of the clutch release bearing with spring release member is obtained simply and easily by general axial insertion of the fingers through the elastically yielding spring release arms.

Various modifications, changes and embodiments have been suggested in the present disclosure, other such changes and modifications will be obvious to those skilled in the present art. It is therefore intended that the present disclosure be taken as illustrative only and not limiting of the scope of the present invention.

The present application is related to a disclosure contained in co-pending application filed on even date herewith based upon German patent application No. P 2327022.6 filed on May 26, 1973 by the same inventors. In that disclosure a clutch release bearing and friction clutch assembly is provided in which a race member of the clutch release bearing is formed with an axial projection extending through the bore of the annular spring release member as opposed to the present invention wherein the fingers extend through the slots formed in the spring release member. Reference may be made to the aforementioned co-pending application and its disclosure is incorporated herein as if more fully set forth.

What is claimed is:

1. A clutch release bearing for attachment with a friction clutch having an annular spring release member in which a plurality of slots forming radially inwardly directed arms define a central bore, said clutch release bearing comprising an inner race member and and outer race member, both said race members being made of sheet metal and being arranged concentrically to one another, a plurality of rolling bodies being located between said race members, said inner race member being folded to have a Z-shaped cross section and being formed with an annular shoulder integral therewith and having a plurality of fingers uniformly distributed about its free end and being folded to extend substantially axially away from said rolling bodies and being adapted to project through the slots of said spring release member into engagement therewith.

2. The clutch release bearing according to claim 1 wherein the free ends of the fingers on said inner race member are folded to have an L-shaped cross section.

3. The clutch release bearing according to claim 1 wherein said axially extending fingers are bent radially inwards at their free ends.

4. The clutch release bearing according to claim 1 wherein at least some of the slots of the spring release member have portions of reduced width forming a shoulder and said fingers engage within said slots over said shoulder formed by the reduced portion.

5. The clutch release bearing according to claim 1 wherein the diameter of said shoulder is greater than that of the central bore of said spring release member.

6. The clutch release bearing according to claim 1 wherein the folded ends of said fingers on said inner race member provide substantially radially directed walls adapted to engage the front face of said spring release member.

* * * * *